Patented Nov. 20, 1928.

1,691,954

UNITED STATES PATENT OFFICE.

FRANK H. BERGEIM, OF WOODBURY, NEW JERSEY, ASSIGNOR TO E. I. DU PONT DE NEMOURS & COMPANY, OF WILMINGTON, DELAWARE, A CORPORATION OF DELAWARE.

PRODUCTION OF ERYTHRITOL TETRANITRATE.

No Drawing. Application filed April 15, 1927. Serial No. 184,180.

This invention relates to the production of erythritol tetranitrate, and more particularly relates to the nitration of erythritol, $C_4H_6(OH)_4$, by dissolving the same in sulphuric acid and adding the solution to nitric acid or mixed acid containing a large proportion of nitric acid. Also the invention relates to the stabilization of erythritol tetranitrate. The major objects of the invention are to provide such procedures.

In the literature (Stenhouse Ann. 70, 226) it is reported that erythritol tetranitrate may be prepared by dissolving erythritol in strong nitric acid and precipitating the nitrated product by adding sulphuric acid. However, the product prepared by this method has a poor chemical stability (Naoum, Nitroglycerine and Nitroglycerine Sprengstoffe p. 218). In addition to the undesirable chemical stability of the product thus prepared the process itself is open to serious objection as being unsafe for commercial manufacture, in that it involves the dissolution of an organic body in strong nitric acid, forming a mixture in itself an explosive. I have provided a process, comprised by the present invention, wherein are embodied new and valuable features, making the process itself safe as a manufacturing operation and producing a product markedly superior in chemical stability to that previously prepared.

The safety feature involves, as the first step, the dissolving of erythritol in sulphuric acid. This liberates considerable heat of reaction in forming a non-explosive compound, thus preventing this heat from being liberated later in the process when erythritol comes in contact with nitric acid. When the sulphuric acid solution is added to strong nitric acid or a mixed acid high in nitric acid, so little heat is liberated that the nitrator must even be kept warm with steam.

Another feature of the present process is the stabilization of the nitrated product by dissolving it in a water soluble solvent such as alcohol or acetone, adding a weak alkali such as sodium or ammonium carbonate, and then forcing the erythritol tetranitrate out of solution by adding water. This method of stabilization gives a product of excellent stability superior in this respect to the erythritol tetranitrate described in the literature.

Without restricting the invention thereto, the following is cited as a specific example of the manner in which the invention may be carried out (parts by weight):—One part of erythritol is dissolved in 5½ parts of concentrated sulphuric acid 90-95% strength, using cooling water to prevent the temperature rising to such an extent that the erythritol becomes carbonized, it being advisable not to permit the temperature to rise above 40 to 50° C. When all of the erythritol has dissolved this solution is run into 7 parts of strong nitric acid (90-100%) keeping the temperature between 40° and 60° C. Instead of strong nitric acid, there may be used with equally good results a mixed acid of relatively low sulphuric acid content, containing for example 12% $H_2SO_4$, 80% $HNO_3$, and 8% $H_2O$. The mixture is then agitated for a short time, say 20 to 30 minutes, after the addition of the sulphuric acid solution has been completed. The erythritol tetranitrate separates as an oil in the warm waste acid. By cooling slowly with rapid agitation the explosive is obtained in a fine crystalline condition. It may be filtered from the waste acid, or the whole mixture drowned. In either case, the slightly acid product is purified and stabilized by dissolving in warm alcohol, treating the alcoholic solution with preferably powdered ammonium carbonate until neutralized, and cooling to crystallize. Desirably, the neutralized product may be forced out of solution by adding water. The explosive thus obtained is a white crystalline product having excellent stability and a nitrogen content very close to the theoretical (18.53% N).

In the method of stabilization, it is to be understood that other water soluble solvents than alcohol may be used. It is not necessary to add water to the solvent in order to obtain a satisfactory product but by so doing the yield is brought up to very near the theoretical. It is also to be understood that other weak alkalies than ammonium carbonate, such as sodium and potassium carbonates or bicarbonates may be used; and in the claims references to "carbonate" are to be understood as including "bicarbonate", except as otherwise evident. Furthermore, while the preferred process of stabilizing comprises dissolving the crude product in a water soluble solvent, e. g. alcohol, and (after neutralizing) forcing the product out of solution by adding water, since water soluble solvents offer the advantage of dissolving an appreciable amount of carbonate and also offer the advantage of giving the opportunity of completely recovering the stabilized product by subsequent mixing with water, it is to be understood that water soluble solvents need not necessarily be used. Thus, solvents such as chloroform, ether and toluene may be used; but recovery of the stabilized product from these solutions is more difficult and expensive than from water-soluble solvents. Whether water-soluble, or water-insoluble solvents be used and whether or not forcing the product out by the addition of water be resorted to, a particular feature of the stabilization procedure is, the treatment of erythritol tetranitrate in solution with weak alkali.

In regard to the nitration process proper, it is not necessary to adhere strictly to the acid ratios given in order to obtain goods results. While I prefer the ratio of 5½ parts of sulphuric acid to one of erythritol, an equally good product, though in smaller yield, may be obtained by increasing or decreasing this ratio. In the same way, the nitric acid or mixed acid ratios may be varied widely without departing from the spirit of the invention.

I claim:

1. A process for the nitration of erythritol which comprises dissolving the alcohol in sulphuric acid, and adding the solution thus prepared to nitric acid.

2. The process of claim 1 in which the sulphuric acid is of 90–95% strength.

3. The process of claim 1 in which the nitric acid contains sulphuric acid.

4. The process of claim 1 in which the nitric acid is of about 90% strength.

5. The process of claim 1 in which the temperature of the nitrating mixture is maintained at about 40–60° C. until the nitration of the alcohol is substantially complete.

In testimony whereof I affix my signature.

FRANK H. BERGEIM.